(12) United States Patent
Martelli

(10) Patent No.: US 10,772,313 B1
(45) Date of Patent: Sep. 15, 2020

(54) HOOF PROTECTION APPARATUS AND METHOD

(71) Applicant: John D. Martelli, Pensacola, FL (US)

(72) Inventor: John D. Martelli, Pensacola, FL (US)

( * ) Notice: Subject to any disclaimer, the term of this patent is extended or adjusted under 35 U.S.C. 154(b) by 359 days.

(21) Appl. No.: 15/183,863

(22) Filed: Jun. 16, 2016

(51) Int. Cl.
*A01L 3/04* (2006.01)
*A01K 13/00* (2006.01)

(52) U.S. Cl.
CPC .............. *A01L 3/04* (2013.01); *A01K 13/007* (2013.01); *A01K 2227/10* (2013.01)

(58) Field of Classification Search
CPC ..... A01L 3/04; A01L 3/00; A01L 7/04; A01K 13/007; A01K 2227/10
See application file for complete search history.

(56) References Cited

U.S. PATENT DOCUMENTS

| | | | | |
|---|---|---|---|---|
| 363,996 A * | 5/1887 | Dunning | ............. | A01L 3/04 168/19 |
| 696,060 A * | 3/1902 | Locraft | ............. | A01L 3/04 168/19 |
| 902,800 A * | 11/1908 | Beauchemin | ............. | A01L 3/04 168/19 |
| 1,206,640 A * | 11/1916 | Zipay | ............. | A01L 3/04 168/19 |
| 1,234,747 A * | 7/1917 | Frej | ............. | A01L 3/04 168/19 |
| 1,340,764 A * | 5/1920 | Grabowski | ............. | A01L 3/04 168/19 |
| 1,351,769 A * | 9/1920 | Leinweber | ............. | A01L 3/04 168/19 |
| 1,357,399 A * | 11/1920 | Horn | ............. | A01L 3/04 168/22 |
| 1,416,658 A * | 5/1922 | Michelsen | ............. | A01L 3/04 168/19 |
| 1,435,169 A * | 11/1922 | Lysiak | ............. | A01L 3/04 168/19 |

(Continued)

FOREIGN PATENT DOCUMENTS

| | | | | |
|---|---|---|---|---|
| FR | 371428 A | * | 3/1907 | ............. A01L 3/04 |
| FR | 467428 A | * | 6/1914 | ............. A01L 3/04 |
| FR | 470187 A | * | 8/1914 | ............. A01L 3/04 |

OTHER PUBLICATIONS

Machine translation of FR 470187 to Kothmayer et al., published Aug. 1914.*

*Primary Examiner* — Kathleen I Alker
(74) *Attorney, Agent, or Firm* — J. Nevin Shaffer, Jr.

(57) ABSTRACT

A hoof protection apparatus and method includes a hoof support platform with a top, a bottom, a front, a first side, a second side, and a space between the first side and the second side, where the front is connected by a hinge device to the first side and by a hinge device to the second side such that the first side is independently movable and such that the second side is independently movable. At least three separate hoof contact devices are provided where at least one hoof contact device is connected to the front of the hoof support platform and at least one hoof contact device is connected to the first side and at least one hoof contact device is connected with the second side. An attachment device for attaching the hoof protection apparatus to a hoof is provided where the attachment device is removably attached to the hoof protection apparatus.

19 Claims, 3 Drawing Sheets

(56) References Cited

U.S. PATENT DOCUMENTS

| | | | | |
|---|---|---|---|---|
| 1,743,504 A | * | 1/1930 | Tripp | A01L 3/04 168/22 |
| 2016/0044907 A1 | * | 2/2016 | Buchanan | A01L 3/04 168/1 |

* cited by examiner

HOOF PROTECTION APPARATUS AND METHOD

FIELD OF THE INVENTION

This invention relates to a hoof protection apparatus and method. In particular, in accordance with one embodiment, the invention relates to a hoof protection apparatus that includes a hoof support platform with a top, a bottom, a front, a first side, a second side, and a space between the first side and the second side, where the front is connected by a hinge device to the first side and by a hinge device to the second side such that the first side is independently movable and such that the second side is independently movable. At least three separate hoof contact devices are provided where at least one hoof contact device is connected to the front of the hoof support platform and at least one hoof contact device is connected to the first side and at least one hoof contact device is connected with the second side. An attachment device for attaching the hoof protection apparatus to a hoof is provided where the attachment device is removably attached to the hoof protection apparatus.

BACKGROUND OF THE INVENTION

A problem exists with regard to the protection of animal feet. Humans and humans on behalf of animals have adopted various types of shoes to protect their feet. In particular, but not by way of limitation, horse hoofs have been fitted with "horse shoes" so as to protect them and such horse "shoes" are well known. However, the prior art and current "state of the art" horse shoe, for example only and not by way of limitation, is a relatively inflexible device that is difficult and time consuming to shape and fit to a particular hoof size and shape. Further, attaching the current horse shoe is a difficult and potentially risky procedure requiring the use of nails, typically, to be hammered into the hoof. Since more than one nail is required, this also is a time consuming and tedious evolution. Still further, while not harming the animal, the hoof is degraded by the introduction of nails by force such that over time a horse hoof may become unstable placing the horse's health in jeopardy.

Thus, there is a need in the art for a protection device that is easily adjustable to conform to any size hoof, that is easy to attach and remove and that does not degrade a hoof in any way.

It therefore is an object of this invention to provide a hoof protection apparatus and method for protecting the hoof of an animal that adjusts to the size of a particular hoof easily and without necessitating trial and error testing. Further, it is an object of the present invention to provide for a hoof protection device that is easy to attach and remove and that requires no invasive attachment devices, such as nails, such that use of the present invention does not degrade but preserves and maintains hoof health.

SUMMARY OF THE INVENTION

Accordingly, the hoof protection apparatus and method of the present invention, according to one embodiment, includes a hoof support platform with a top, a bottom, a front, a first side, a second side, and a space between the first side and the second side, where the front is connected by a hinge device to the first side and by a hinge device to the second side such that the first side is independently movable and such that the second side is independently movable. At least three separate hoof contact devices are provided where at least one hoof contact device is connected to the front of the hoof support platform and at least one hoof contact device is connected to the first side and at least one hoof contact device is connected with the second side. An attachment device for attaching the hoof protection apparatus to a hoof is provided where the attachment device is removably attached to the hoof protection apparatus.

All terms used herein are given their common meaning so that "hoof" identifies and describes the horny part of the foot of an ungulate animal, especially, but not limited to, a horse. Thus, while the preferred embodiment is for ungulate animals other animals, including humans, may find use of the present invention.

"Space" describes an open area where no platform is present as made clear by the figures and as more particularly described herein. As used herein, "hinge device" is given its ordinary meaning such that by means of the hinge device the first and second side are capable of independent movement in relation to the front of the hoof support platform. Any hinge as illustrated herein or as now known or hereafter developed that facilitates such movement is suitable for the purposes of the invention.

"Hoof contact device" is used to describe a device configured to make contact with the hoof of an animal when the apparatus of the present invention is in place on a hoof. The purpose of the hoof contact device, as described more fully hereafter, is to ensure that the hoof protection apparatus of the present invention is securely attached to the hoof, in a non-invasive and non-destructive manner, when used in accordance with the method of the present invention as described and illustrated herein.

"Attachment device" describes an device that secures the hoof protection apparatus in place on a hoof, in a non-invasive and non-destructive manner, once the hoof protection apparatus is fitted to a particular hoof. In one embodiment the "attachment device" is a plastic zip tie, as are known and not described more fully hereafter.

According to another aspect of the invention, the attachment device is removably attached to the hoof protection apparatus at the at least three separate hoof contact devices.

In one aspect, the at least three separate hoof contact devices include a passageway, the passageway configured to receive and retain the attachment device within the passageway.

In a further aspect, the hoof contact device connected to the first side and the hoof contact device connected to the second side further include a support extending therefrom and facing the space between the first side and the second side, the support configured to receive and retain the attachment device.

In another aspect, the hoof support platform includes more than one location adjustment receiver and the more than one location adjustment receiver is configured to receive and retain the hoof contact devices in a selected location adjustment receiver.

In one aspect, the at least one hoof contact device connected to the front of the hoof support platform includes an extended contact face.

In a further aspect, the at least one hoof contact device connected to the first side and the at least one hoof contact device connected with the second side include an extended contact face with a rounded projection.

In another aspect, the apparatus further includes removably attachable studs where the removably attachable studs extend from the bottom of the hoof support platform. And in another aspect, the studs are attached at the hinge devices and to the first side and the second side in proximity to the space.

According to another embodiment of the invention, a hoof protection apparatus includes a hoof support platform with a top, a bottom, a front, a first side, a second side, and a space between the first side and the second side, where the front is connected by a hinge device to the first side and by a hinge device to the second side such that the first side is independently movable and such that the second side is independently movable. At least three separate hoof contact devices are provided where at least one hoof contact device is connected to the top front of the hoof support platform and at least one hoof contact device is connected to the top of the first side and at least one hoof contact device is connected with the top of the second side and where the hoof contact device connected to the top of the first side and the hoof contact device connected with the top of the second side further include a support extending therefrom and facing the space between the first side and the second side, the support configured to receive and retain an attachment device at a distance apart from the hoof contact devices. An attachment device is provided for attaching the hoof protection apparatus to a hoof where the attachment device is removably attached to the hoof protection apparatus at the at least three separate hoof contact devices.

In one aspect, the at least three separate hoof contact devices include a passageway, the passageway configured to receive and retain the attachment device within the passageway.

In one aspect, the first side and the second side include more than one location adjustment receiver and the more than one location adjustment receiver is configured to receive and retain the hoof contact device in a selected location adjustment receiver.

In another aspect, the at least one hoof contact device connected to the top front of the hoof support platform includes an extended contact face.

In another aspect, the at least one hoof contact device connected to the top of the first side and the at least one hoof contact device connected with the top of the second side include an extended contact face with a rounded projection.

In a further aspect, the invention further includes removably attachable studs where the removably attachable studs extend from the bottom of the hoof support platform. And in a further aspect, the studs are attached at the hinge devices and to the first side and the second side in proximity to the space.

In another aspect, the attachment device is a zip tie.

According to another embodiment of the invention, a hoof protection method consists of:
a. providing a hoof support platform with a top, a bottom, a front, a first side, a second side, and a space between the first side and the second side, where the front is connected by a hinge device to the first side and by a hinge device to the second side such that the first side is independently movable and such that the second side is independently movable; at least three separate hoof contact devices where at least one hoof contact device is connected to front of the hoof support platform and at least one hoof contact device is connected to the first side and at least one hoof contact device is connected with the second side; and an attachment device for attaching the hoof protection apparatus to a hoof where the attachment device is removably attached to the hoof protection apparatus; and
b. moving the first side and the second side such that they conform to the shape of a hoof.

In another aspect, the method further includes placing the hoof support platform on the hoof and attaching the hoof support platform with the attachment device.

In a further aspect, the method further includes providing removably attachable studs where the removably attachable studs extend from the bottom of the hoof support platform when attached.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
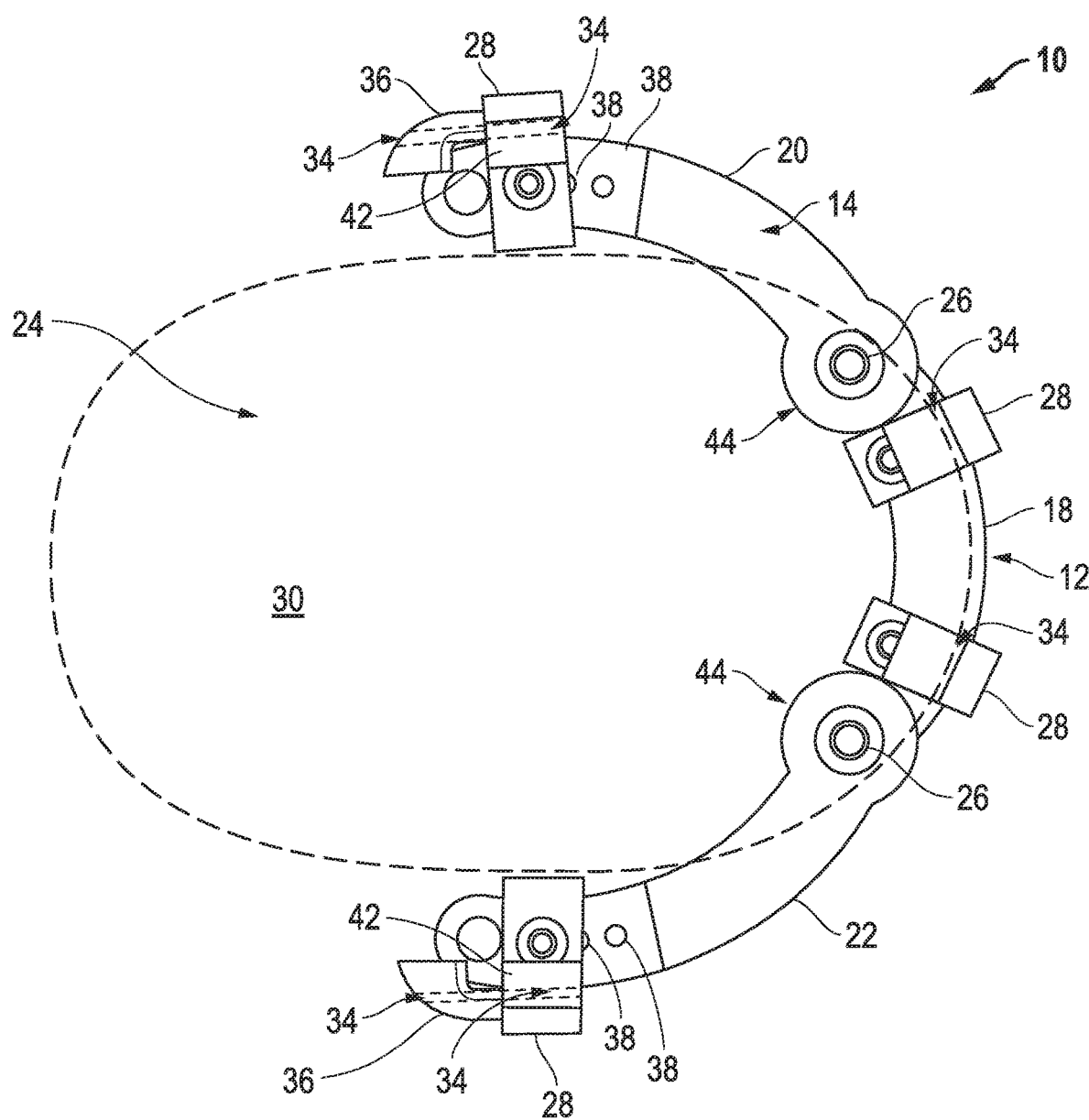
FIG. 1 is a top partial cut away view of the hoof protection apparatus of the present invention shown in the open position.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
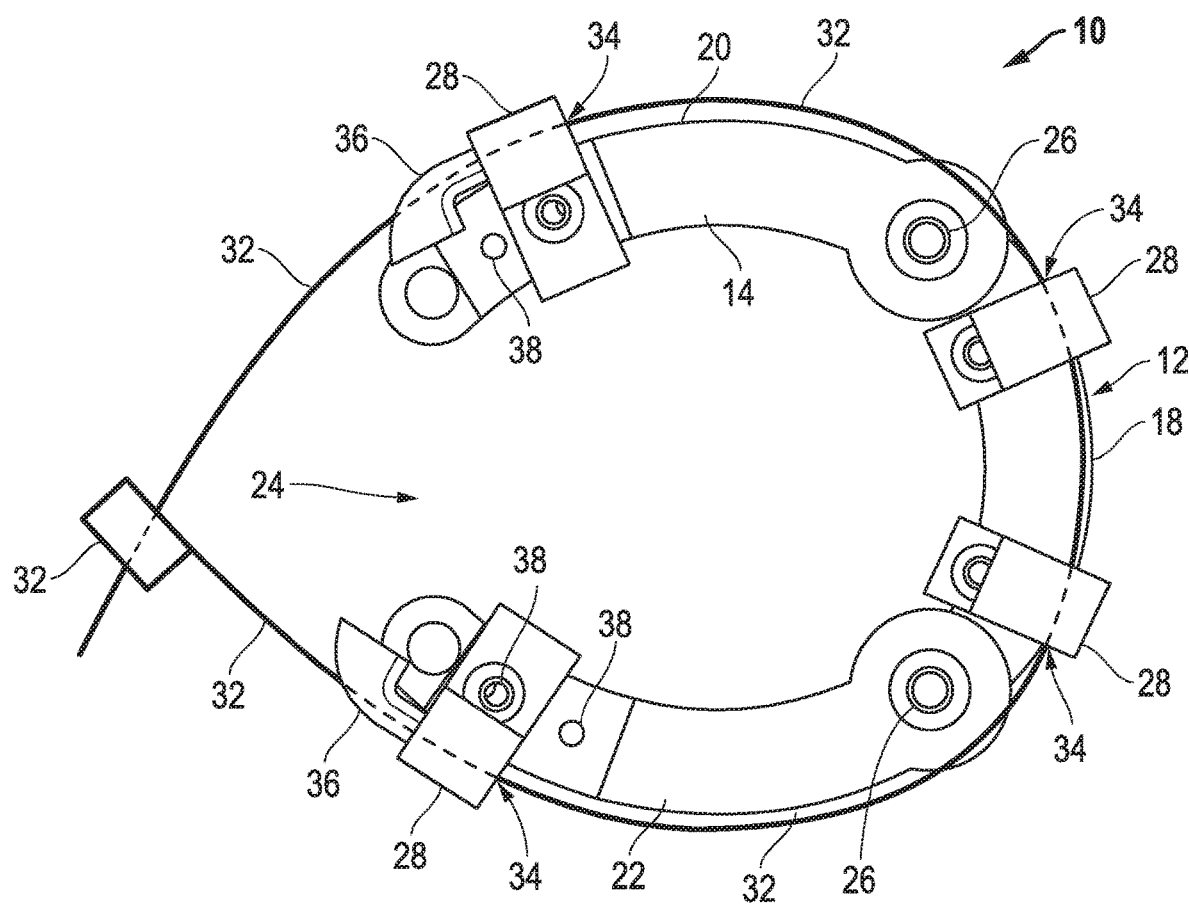
FIG. 2 is a top partial cut away view of the invention of FIG. 1 in a closed position and showing the attachment device.
Figure 3:
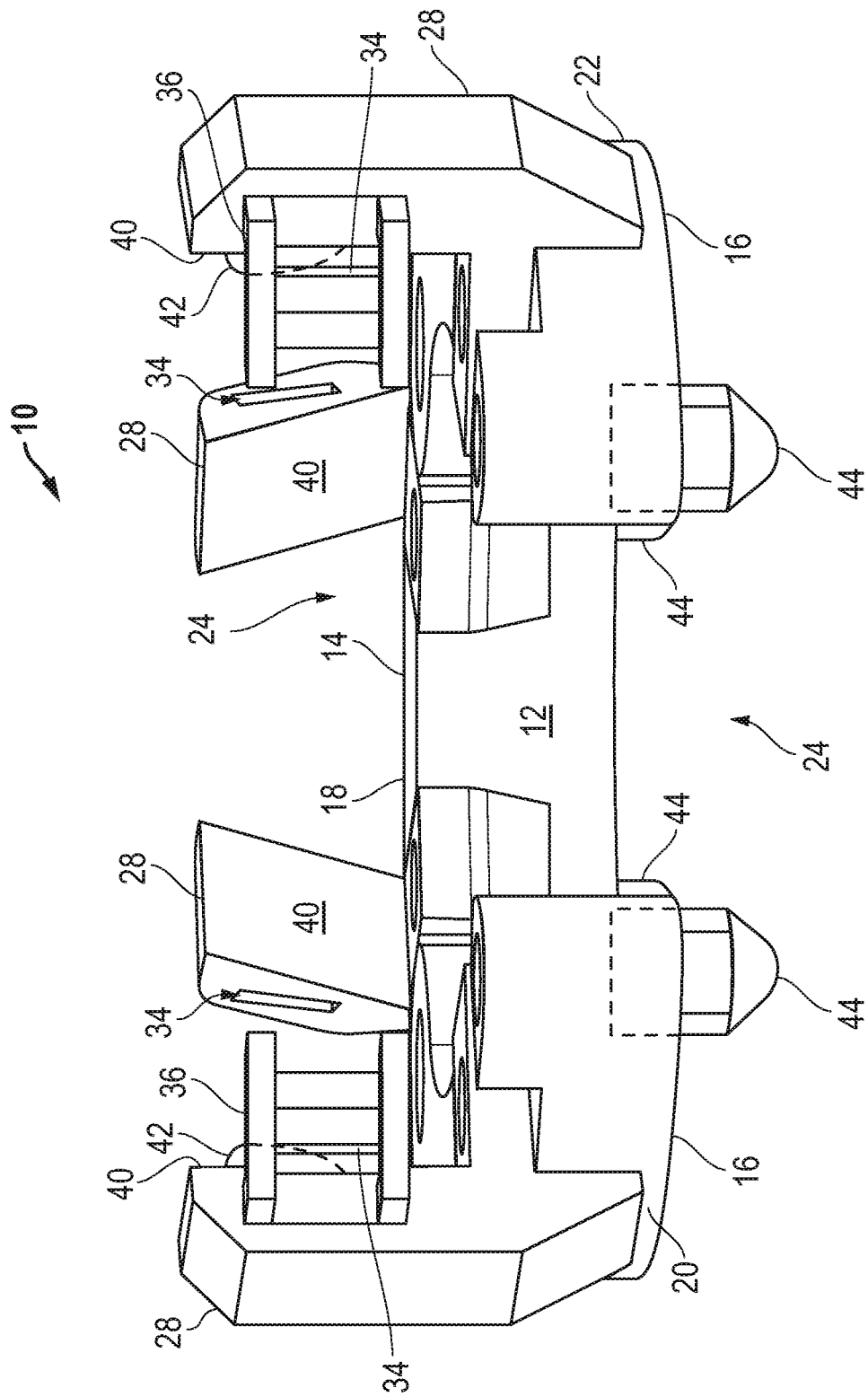
FIG. 3 is a rear view of the invention of FIG. 1 from the open space and showing removably attachable studs.

A preferred embodiment of the present invention is illustrated by way of example in FIGS. 1-3. With specific reference to FIGS. 1 and 2, hoof protection apparatus 10 includes a hoof support platform 12 with a top 14, bottom 16, front 18, first side 20, second side 22, and a space 24 between first side 20 and second side 22 as illustrated. First side 20 is movably connected with front 18 by hinge 26 and, likewise, second side 22 is movably connected with front 18 with another hinge 26.

Hoof contact device 28 is configured to contact hoof 30, shown in dotted lines, along the sides of hoof 30 while the top 14 of hoof support platform 12 contacts the bottom of hoof 30 and prevents the bottom of hoof 30 from contacting the ground (not shown) as with prior art horse shoes, for example only. Preferably at least three hoof contact devices 28 are provided with one hoof contact device 28 connected with the front 18 and one hoof contact device 28 connected with first side 20 and second side 22. As illustrated, more that three hoof contact devices 28 may be provided and, preferably there are four, with two hoof contact devices 28 attached to the front 18. In one embodiment, the hoof contact devices 28 are connected, by screws, bolts or the like, to the top 14 of hoof support platform 12, as shown although any desired location for attachment may be utilized.

Still referring to FIGS. 1 and 2, FIG. 2 illustrates an attachment device 32 for attaching the hoof protection apparatus 10 to a hoof 30. Preferably, attachment device 32 is a flexible device, such as a zip tie as shown for example only and not by limitation.

The attachment device 32 of the present invention is removably attached to the hoof protection apparatus 10. In one aspect of the invention, the attachment device 32 is connected with the at least three hoof contact devices 28. In another aspect, passageways 34 are provided in the at least three hoof contact devices 28 through which the attachment device 32 is threaded. FIGS. 1 and 2 show the passageways 34 in cut away for clarity while FIG. 3 shows the passageways 34 intact. Attachment device 32 when in place holds hoof protection apparatus 10 in place by preventing movement of first side 20 and second side 22. Thus, after placing the hoof 30 against the hoof contact device(s) 28 at the front 18 of hoof support platform 12, simply tightening attachment device 32 causes first side 20 and second side 22 to move inward toward space 24 until the hoof contact devices 28 on the first side 20 and the second side 22 contact the hoof 30 (or other part of the animal above the hoof 30, for example only). Once contact is made and movement of sides 20 and 22 stop, the hoof protection apparatus 10 exactly mirrors the shape of the animal hoof 30 to which it is connected and attachment device 32 is secured at that position. A zip tie, for example only, allows contraction but not release.

Removal of attachment device 32 is simply a matter of cutting it, for example only, or releasing it in some other manner known in the art. Thereafter, hoof protection apparatus 10 is easily removed, replaced and or refurbished, all without injury to hoof 30.

In one embodiment, the hoof contact device 28 connected to the first side 20 and the hoof contact device 28 connected h second side 22 further includes a support 36 extending from the hoof contact device 28 and facing toward space 24. Support 36 is a ramp like structure that is configured to receive and retain the attachment device 32. When present support 36 extends attachment device 32 away from hoof contact device 28 and helps ensure that attachment device 32 does not pinch down too much on a horse's hind leg (not shown) and allows for use with horses with large legs as well.

In another aspect of the invention, hoof support platform 12 includes more than one location adjustment receiver 38. The more than one location adjustment receiver 38 is configured to receive and retain hoof contact devices 28 in a selected location adjustment receiver 38. In this way, the placement of hoof contact devices 28 is adjustable along the hoof support platform 12 to accommodate hoofs 30 of various sizes and shapes.

Referring now to FIG. 3, other features and advantages of the present invention are illustrated. In one aspect, it has been found to be advantageous where the at least one hoof contact device 28 connected to the front 18 (two are shown in the Figure) of the hoof support platform 12 includes an extended contact face 40. As shown, extended contact face 40 extends upward from the top 14 of hoof support platform 12 in a flat plane so as to engage hoof 30 (not shown) along a greater portion of hoof 30. Also, it has been found advantageous for extended contact face 40 to be angled inward and toward open space 24 so as to ensure a better grip on and to mirror the natural slope of hoof 30.

In another aspect of the invention, it has been found advantageous that the at least one hoof contact device 28 connected to the first side 20 and the at least one hoof contact device 28 connected with the second side 22 include an extended contact face 40 with a rounded projection 42. This structure allows contact with the back of a horse's leg above the hoof 30 (not shown) in a manner less likely to cause discomfort to the animal.

Still referring to FIG. 3, one aspect of the invention further includes removably attachable studs 44 where the removably attachable studs 44 extend from the bottom 16 of the hoof support platform 12 as shown. The purpose of this structure is to provide traction. Certainly the bottom 16 may be grooved or include tread of some sort, all by way of example and not by limitation. Nonetheless, Applicant has found removably attachable studs 44 superior as they are easily added and replaced when worn out without having to replace the entire hoof protection apparatus 10. In one aspect, it has been determined to be advantageous when studs 44 are attached at the hinge devices 26 (See also FIG. 1) and to the first side 20 and the second side 22 in proximity to space 24

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A hoof protection apparatus comprising:
    a. a hoof support platform with a top, a bottom, a front, a first side with a connection end and a free end, a second side with a connection end and a free end, and a space between said first side and said second side, wherein the front is connected by a hinge device to the connection end of the first side and by a hinge device to the connection end of the second side such that the first side is independently movable and such that the second side is independently movable;
    b. at least three separate hoof contact devices wherein at least one hoof contact device is connected to the front of the hoof support platform and at least one hoof contact device is connected to the first side and at least one hoof contact device is connected with the second side and wherein at least one of the at least three separate hoof contact devices includes a passageway within the at least one hoof contact device;

c. an attachment device for attaching said hoof support platform to a hoof wherein said attachment device is removably attached to the hoof support platform within said passageway through at least one of the at least three separate hoof contact devices; and d. a first support and a second support wherein said first support is connected with said at least one hoof contact device connected with the first side and wherein said second support is connected with said at least one hoof contact device connected with the second side such that the first support extends beyond the free end of the first side and the second support extends beyond the free end of the second side and wherein the first support and the second support are configured to receive and retain said attachment device beyond the free end of the first side and beyond the free end of the second side, respectively.

2. The apparatus of claim 1 wherein said attachment device is removably attached to the hoof support platform at each of said at least three separate hoof contact devices.

3. The apparatus of claim 1 wherein each of said at least three separate hoof contact devices each includes a passageway within said hoof contact device, and each of said passageways are configured to receive and retain said attachment device within said passageway.

4. The apparatus of claim 1 wherein said hoof support platform includes more than one location adjustment receiver and wherein said more than one location adjustment receiver is configured to receive and retain said hoof contact devices in a selected one of the location adjustment receivers.

5. The apparatus of claim 1 wherein said at least one hoof contact device connected to the front of the hoof support platform includes an extended contact face.

6. The apparatus of claim 1 wherein said at least one hoof contact device connected to the first side and said at least one hoof contact device connected with the second side each include an extended contact face with a rounded projection.

7. The apparatus of claim 1 further including removably attachable studs wherein said removably attachable studs extend from the bottom of said hoof support platform.

8. The apparatus of claim 7 wherein said studs are in proximity to said hinge devices and to the first side and the second side in proximity to said space.

9. A hoof protection apparatus comprising:
a. a hoof support platform with a top, a bottom, a front, a first side with a connection end and a free end, a second side with a connection end and a free end, and a space between said first side and said second side, wherein the front is connected by a hinge device to the connection end of the first side and by a hinge device to the connection end of the second side such that the first side is independently movable and such that the second side is independently movable;

b. at least three separate hoof contact devices wherein at least one hoof contact device is connected to the front of the hoof support platform and at least one hoof contact device is connected to the first side and at least one hoof contact device is connected with the second side wherein said at least one hoof contact device connected to the first side includes a first support and wherein the at least one hoof contact device connected with the second side includes a second support wherein said first support extends beyond the free end of the first side and wherein said second support extends beyond the free end of the second side and wherein both supports face said space between said first side and said second side, such that said first support and said second support receive and retain an attachment device at a distance from said hoof contact devices beyond the free ends of each of the sides; and c. an attachment device for attaching said hoof support platform to a hoof wherein said attachment device is removably attached to the hoof support platform at said at least three separate hoof contact devices.

10. The apparatus of claim 9 wherein said at least three separate hoof contact devices each include a passageway through the hoof contact device and wherein each said passageway is configured to receive and retain said attachment device within said passageway.

11. The apparatus of claim 9 wherein said first side and said second side each include more than one location adjustment receiver and wherein each of said more than one location adjustment receiver is configured to receive and retain a hoof contact device.

12. The apparatus of claim 9 wherein said at least one hoof contact device connected to the front of the hoof support platform includes an extended contact face.

13. The apparatus of claim 9 wherein said at least one hoof contact device connected to the first side and said at least one hoof contact device connected with the second side each include an extended contact face with a rounded projection.

14. The apparatus of claim 9 further including removably attachable studs wherein said removably attachable studs extend from the bottom of said hoof support platform.

15. The apparatus of claim 14 wherein said studs are in proximity to said hinge devices and to the first side and the second side in proximity to said space.

16. The apparatus of claim 9 wherein said attachment device is a zip tie.

17. A hoof protection method comprising:
a. providing a hoof support platform with a top, a bottom, a front, a first side with a connection end and a free end, a second side with a connection end and a lice end, and a space between said first side and said second side, wherein the front is connected by a hinge device to the connection end of the first side and by a hinge device to the connection end of the second side such that the first side is independently movable and such that the second side is independently movable; at least three separate hoof contact devices wherein at least one hoof contact device is connected to the front of the hoof support platform and at least one hoof contact device is connected to the first side and at least one hoof contact device is connected with the second side and wherein the at least one hoof contact device on the first side includes a first support and wherein the at least one hoof contact device on the second side includes a second support wherein the first support extends beyond the free end of the first side and wherein the second support extends beyond the free end of the second side and the first support and the second support facing said space between said first side and said second side, said first support and said second support configured to receive and retain an attachment device at a distance apart from said hoof contact devices beyond the free ends of each of the sides; and an attachment device for attaching said hoof support platform to a hoof wherein said attachment device is removably attached to the hoof contact devices; and b. moving said first side and said second side such that they conform to the shape of a hoof.

18. The method of claim 17 further including placing said hoof support platform on said hoof and attaching said hoof support platform with said attachment device.

19. The method of claim 17 wherein said at least three separate hoof contact devices each include a passageway through said hoof contact device, each said passageway configured to receive and retain said attachment device within said passageway.

\* \* \* \* \*

UNITED STATES PATENT AND TRADEMARK OFFICE
CERTIFICATE OF CORRECTION

PATENT NO. : 10,772,313 B1
APPLICATION NO. : 15/183863
DATED : September 15, 2020
INVENTOR(S) : John D. Martelli Page 1 of 1

It is certified that error appears in the above-identified patent and that said Letters Patent is hereby corrected as shown below:

In the Specification

In Column 5, Line 62, "the hoof contact device 28 connected h second side" should read --the hoof contact device 28 connected with the second side--.

In the Claims

In the Claim 17(a), Column 8, Line 44, "a second side with a connection end and a lice end" should read --a second side with a connection end and a free end--.

Signed and Sealed this
Twelfth Day of January, 2021

Andrei Iancu
*Director of the United States Patent and Trademark Office*